US011976987B2

(12) United States Patent
Jurgschat et al.

(10) Patent No.: US 11,976,987 B2
(45) Date of Patent: May 7, 2024

(54) MODULE AND METHOD FOR MONITORING ENVIRONMENTAL INFLUENCES ON A MODULE INCLUDING MULTIPLE STRESS MEASURING CELLS

(71) Applicant: Robert Bosch GmbH, Stuttgart (DE)

(72) Inventors: Clemens Jurgschat, Ehningen (DE); Torsten Ohms, Vaihingen/Enz-Aurich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 54 days.

(21) Appl. No.: 17/838,952

(22) Filed: Jun. 13, 2022

(65) Prior Publication Data

US 2022/0404216 A1 Dec. 22, 2022

(30) Foreign Application Priority Data

Jun. 16, 2021 (DE) ...................... 10 2021 206 131.1

(51) Int. Cl.
*G01L 1/00* (2006.01)
*G01L 25/00* (2006.01)

(52) U.S. Cl.
CPC .............. *G01L 1/005* (2013.01); *G01L 25/00* (2013.01)

(58) Field of Classification Search
CPC ........ G01N 5/02–025; G01N 5/04–045; B81B 3/0089; B81B 3/007–0072; G01L 1/2281; G01L 1/2275; G01L 1/2293; G01L 1/2268
See application file for complete search history.

(56) References Cited

U.S. PATENT DOCUMENTS

| | | | | |
|---|---|---|---|---|
| 4,778,998 A | * | 10/1988 | Carnahan ............... | G01N 27/66 250/382 |
| 7,639,366 B2 | * | 12/2009 | Spanner .................. | G01D 5/26 356/486 |
| 7,726,199 B2 | * | 6/2010 | Shkel ..................... | G01L 1/142 73/780 |

(Continued)

FOREIGN PATENT DOCUMENTS

DE 10154495 A1 5/2003
EP 2490036 A1 8/2012

*Primary Examiner* — Tran M. Tran
(74) *Attorney, Agent, or Firm* — NORTON ROSE FULBRIGHT US LLP; Gerard A. Messina

(57) ABSTRACT

A module, including at least one first component in the form of a semiconductor component including multiple stress measuring cells situated in a distributed manner for detecting stress measured values at different measuring positions of the semiconductor component, at least one second component which is mechanically coupled to the semiconductor component, and an evaluation unit, which is designed to ascertain at least one location-dependent stress distribution in the semiconductor component based on the stress measured values detected at one measuring point in time, and to ascertain a deformation state of the at least one second component at the measuring point in time on the basis of the at least one ascertained location-dependent stress distribution in the semiconductor component. A corresponding method for monitoring environmental influences on a module is also described.

15 Claims, 5 Drawing Sheets

(56) References Cited

U.S. PATENT DOCUMENTS

| | | | | |
|---|---|---|---|---|
| 7,800,879 B2* | 9/2010 | Ryan | ............ | G05D 23/20 |
| | | | | 438/54 |
| 8,872,290 B2* | 10/2014 | Hoofman | ............ | G01D 5/183 |
| | | | | 257/E29.324 |
| 9,958,305 B2* | 5/2018 | Nakano | ............ | G01F 1/6845 |
| 9,960,733 B2* | 5/2018 | Motz | ............ | G01L 1/18 |
| 10,094,725 B2* | 10/2018 | Reinmuth | ............ | H01L 22/14 |
| 10,288,498 B2* | 5/2019 | Taguchi | ............ | G01L 1/2243 |
| 10,350,764 B2* | 7/2019 | Ibrocevic | ............ | G01L 1/2268 |
| 10,352,812 B2* | 7/2019 | Hammerschmidt | ............ | G01L 1/18 |
| 10,423,265 B2* | 9/2019 | Filiz | ............ | G06F 3/0418 |
| 11,156,511 B2* | 10/2021 | Wade | ............ | G01L 1/18 |
| 11,515,467 B2* | 11/2022 | Van Der Wiel | ............ | H10N 30/88 |
| 11,653,568 B2* | 5/2023 | Haroun | ............ | H01L 25/16 |
| | | | | 257/417 |
| 11,680,856 B2* | 6/2023 | Vergauwen | ............ | G01L 1/2268 |
| | | | | 73/862.622 |
| 11,714,066 B2* | 8/2023 | Britt | ............ | G01N 29/022 |
| | | | | 73/24.06 |
| 11,747,226 B2* | 9/2023 | Wade | ............ | G01L 1/2231 |
| | | | | 73/727 |
| 2004/0079159 A1* | 4/2004 | Muchow | ............ | G01L 9/0055 |
| | | | | 73/716 |
| 2014/0026670 A1 | 1/2014 | Fornara et al. | | |
| 2017/0331429 A1 | 11/2017 | Motz | | |
| 2023/0288992 A1* | 9/2023 | Taniuchi | ............ | G06F 3/03 |
| | | | | 345/156 |

* cited by examiner

MODULE AND METHOD FOR MONITORING ENVIRONMENTAL INFLUENCES ON A MODULE INCLUDING MULTIPLE STRESS MEASURING CELLS

CROSS REFERENCE

The present application claims the benefit under 35 U.S.C. § 119 of German Patent Application No. DE 10 2021 206 131.1 filed on Jun. 16, 2021, which is expressly incorporated herein by reference in its entirety.

FIELD

The present invention relates to a module. The present invention also relates to a method for monitoring environmental influences on a module.

BACKGROUND INFORMATION

Stress sensors for detecting mechanical stresses in a semiconductor chip are described in the related art such as, for example, European Patent Application No. EP 2 490 036 A1.

SUMMARY

The present invention provides a module and a method for monitoring environmental influences on a module.

The present invention provides possibilities for detecting and characterizing deformations on a module caused by at least one environmental influence, which are frequently not reliably apparent using conventional sensors. For example, a penetration of air moisture into the module may be reliably established with the aid of the present invention, even though no sensory types suitable for reliably determining a moisture content in the module are available the related art. The present invention thus remedies the common deficiency that environmental effects such as, for example, moisture drifts on modules are so far unable to be reliably detected, and thus also unable to be efficiently quantified, as a result of which a meaningful response to the environmental effects in the related art is not possible. A use of the present invention thus enables an improved response to environmental effects during an operation of the respective module, as a result of which a function executed by the module may be improved and/or a service life of the module may be increased.

In one advantageous specific embodiment of the module of the present invention, at least a portion of the stress measuring cells are designed to detect at least one direction-dependent stress measured value. The detection of the at least one direction-dependent stress measured value instead of merely absolute stress measured values frequently enables a more differentiated and thus more reliable detection and characterization of at least one environmental influence affecting the respective module.

The evaluation unit of the present invention is designed preferably to base the at least one location-dependent stress distribution in the semiconductor component for each individual measuring position on a stress value, which is generated as the stress measured value detected at one measuring point in time or as the difference between the stress measured values at one first and one second measuring point in time or as the functional link of multiple location-dependent stress measured values detected at one measuring point in time at the same measuring position or as the difference between the functional links of multiple direction-dependent stress measured values, which have been detected at one first and at one second measuring point in time at the same measuring position. All location-dependent stress distributions enumerated herein may be easily and reliably evaluated as "fingerprints" of the at least one environmental influence affecting the module.

For example, the evaluation unit may be designed to ascertain a location-dependent stress distribution in the form of a gradient distribution, by comparing and/or correlating the underlying stress values with a constant reference value or with the stress value of at least one stress measuring cell serving as a reference. Based on the gradient distribution obtained, it is then possible to reliably recognize the deformation state of the at least one second component at the measuring point in time. In this way, even environmental influences with slow time constants, such as a slow penetration of air moisture into the module, are reliably detectable and characterizable.

The evaluation unit is preferably designed to ascertain multiple location-dependent stress distributions for one measuring point in time by basing the individual stress distributions on stress values generated in different ways, the deformation state of the at least one second component being subsequently ascertained on the basis of the multiple location-dependent stress distributions. Thus, a plurality of "fingerprints" may be ascertained at one measuring point in time, which subsequently allows for a reliable recognition of the deformation state of the at least one second component and of the first component, or of the entire module.

In one further advantageous specific embodiment of the present invention, the evaluation unit is designed to ascertain the deformation state of the at least one second component on the basis of a comparison of the at least one ascertained location-dependent stress distribution with location-dependent stress distributions previously ascertained for defined deformation states. The previously ascertained location-dependent stress distributions may, in addition, represent deformations of the at least one second component caused by particular environmental influences as "comparison fingerprints", which enables a reliable recognition of the at least one environmental influence instantaneously deforming the at least one second module by a simple executable comparison.

Alternatively or in addition, in accordance with an example embodiment of the present invention, the evaluation unit may also be designed to ascertain the deformation state of the at least one second component on the basis of a comparison of the at least one ascertained location-dependent stress distribution with a previously determined model for the deformation behavior of the at least one second component. In this way as well, the deformation state of the at least one second component may be established with a high degree of accuracy and with relatively small error deviations.

As one possible advantageous use, the evaluation unit may be designed to assign a moisture value and/or a concentration value for at least one chemical substance or for a mixture of chemical substances to the ascertained deformation behavior of the at least one second component, and to output the moisture value and/or concentration value. In this way, a sensor is implemented for quantifying a content of the moisture and/or of the at least one chemical substance or mixture of chemical substances at the respective module.

For example, the semiconductor component may be implemented in the form of an ASIC or of a MEMS element with the integrated stress measuring cells. It is noted, however, that the enumerated examples of the semiconductor components are not to be interpreted as exhaustive.

In accordance with an example embodiment of the present invention, the at least one second component preferably includes at least one sensor component, in particular, a MEMS sensor element, in particular, a rotation rate sensor, an acceleration sensor element and/or a pressure sensor element, and/or a chemical sensor, in particular, a gas sensor, and/or an optical sensor element, in particular, a particle sensor. In this case, the evaluation unit may be designed to provide different calibration parameters and/or different evaluation parameters for the measured values of the at least one sensor component as a function of the ascertained deformation state of the at least one sensor component. The interaction of the evaluation unit described herein with the at least one sensor component thus enables an optimization of the calibration parameters and/or of the evaluation parameters in such a way that despite the deformation of the at least one sensor component caused by the at least one environmental influence, stress measured values still relatively accurate and comparatively error-free are output by the at least one sensor component.

In accordance with an example embodiment of the present invention, the evaluation unit may, in particular, also be designed to initiate a recalibration of the at least one sensor component as a function of the ascertained deformation state of the at least one sensor component. As a result of the initiated recalibration, it may be ensured that the at least one sensor component nevertheless outputs reliable measured values despite its deformation caused by the at least one environmental influence.

As an advantageous refinement of the present invention, the evaluation unit may also be designed to indicate and/or to output when the at least one sensor component is in a previously defined deformation state, in particular, if the operability of the at least one sensor component is not ensured, and/or a switch is made between different operating modes as function of the ascertained deformation state of the at least one sensor component, in particular, to switch off the sensor operation if the operability of the at least one sensor component is not ensured. By indicating and/or outputting a piece of information that the at least one sensor component is in the previously defined deformation state, a user of the module may be motivated sooner to repair the damage occurring at at least the at least one sensor component of the module. By switching between different operating modes, it may also be ensured that the at least one sensor component continues to be used only as long as the at least one sensor component is able to reliably fulfill its desired sensor function.

The above-described advantages are also provided by carrying out a corresponding method for monitoring environmental influences on a module. It is expressly noted that the method for monitoring environmental influences according to the specific embodiments of the module explained above may be further refined.

At least the evaluation unit for ascertaining the location-dependent stress distribution and/or the deformation state of the at least one second component is preferably selectively activated, in particular, event-based and/or at regular time intervals and/or user-initiated. By selectively activating the at least one evaluation unit described here, it is possible to reduce the energy consumption of the module equipped therewith.

BRIEF DESCRIPTION OF THE DRAWINGS

Further features and advantages of the present invention are explained below with reference to the figures.

DETAILED DESCRIPTION OF EXAMPLE EMBODIMENTS

Figure 1:
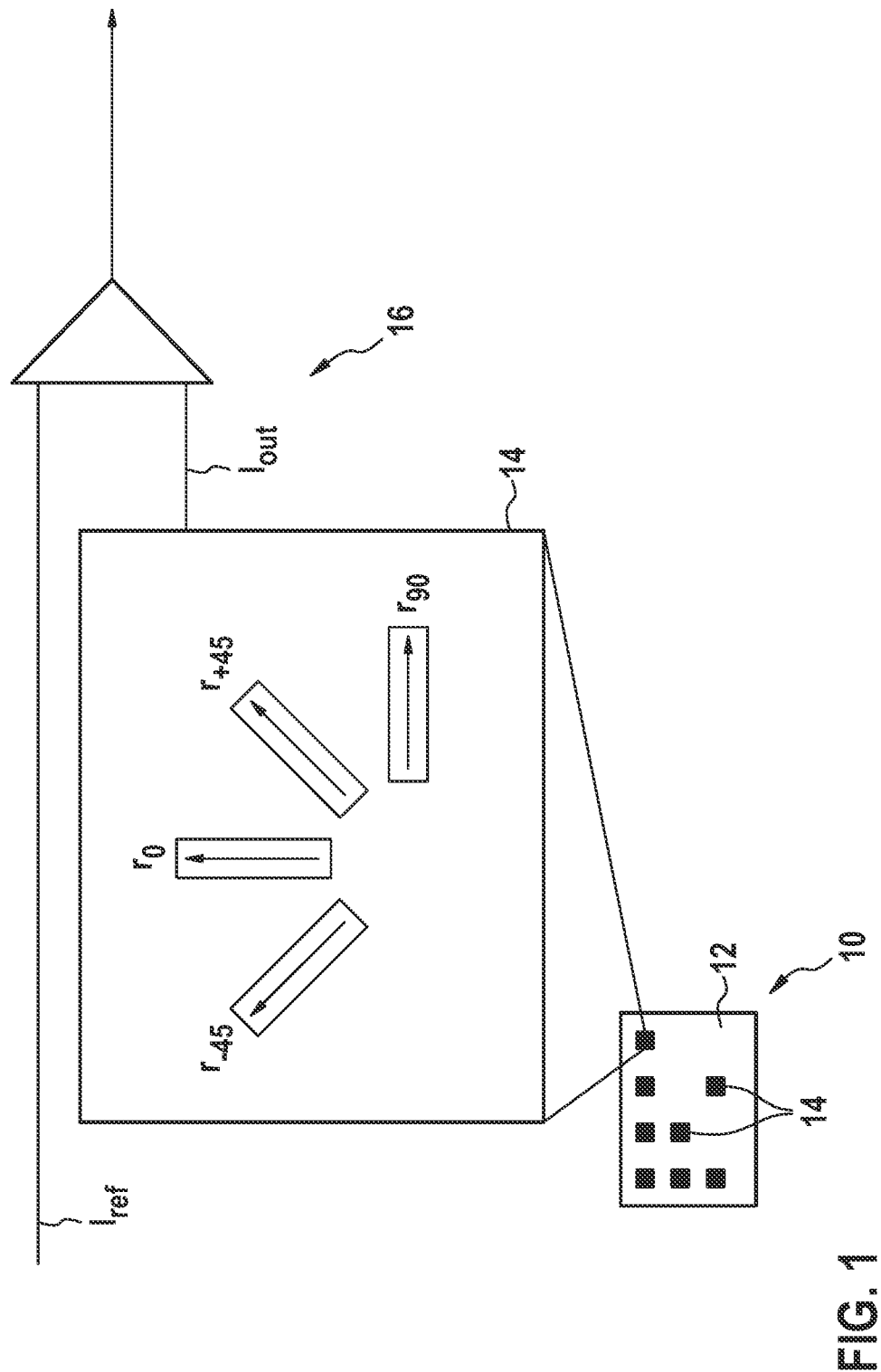
FIG. 1 schematically shows a representation of one first specific embodiment of the module, in accordance with the present invention.

FIG. 1 schematically shows a representation of one first specific embodiment of the module.

Module 10 schematically partially represented in FIG. 1 includes a first component 12 in the form of a semiconductor component 12. Semiconductor component 12 may, for example, be an ASIC (application-specific integrated circuit) or a MEMS element (micro-electro-mechanical system). It is noted, however, that a formability of module 10 is not limited to a particular component type of semiconductor component 12. Module 10 may, in particular, be a chip-level package, a sensor package or an ASIC situated on a circuit board.

Semiconductor component 12 is formed with multiple stress measuring cells 14 situated in a distributed manner, of which one stress measuring cell 14, for example, is shown enlarged in FIG. 1. Stress measuring cells 14 are situated/integrated at different measuring positions of semiconductor component 12. Each of stress measuring cells 14 is designed in such a way that at least one stress measured value and/or strain measured value may be measured with the aid of respective stress measuring cell 14 as stress measured value $1_{out}$. Stress measuring cells 14 of semiconductor component 12 may thus be referred to as stress and/or strain measuring cells 14. Stress measuring cells 14 may be designed, in particular, as semiconductor measuring cells such as silicon measuring cells.

Although this is not visually depicted in FIG. 1, module 10 also includes at least one second component, which is mechanically coupled to semiconductor component 12. The mechanical coupling of the at least one second component to semiconductor component 12 is understood to mean that the at least one second component is mechanically connected to semiconductor component 12 in such a way that a deformity of the at least one second component causes mechanical stresses in semiconductor component 12. The mechanical stresses then result in stress and/or strains at at least some measuring positions of stress measuring cells 14.

Module 10 also has an evaluation unit 16 represented only schematically in FIG. 1, which is designed and/or programmed to ascertain at least one location-dependent stress distribution in semiconductor component 12 on the basis of stress measured values $1_{out}$ of stress measuring cells 14 detected at one measuring point in time. Evaluation unit 16 is subsequently designed and/or programed to ascertain a deformation state of the at least one second component at the measuring point in time on the basis of the at least one ascertained location-dependent stress distribution in semiconductor component 12. Due to the mechanical coupling of the at least one second component with semiconductor component 12, the at least one location-dependent stress distribution in semiconductor component 12 ascertained by evaluation unit 16 per measuring point in time represents an instantaneous deformation of the at least one second component in each case at the measuring point in time. The at least one location-dependent stress distribution may therefore also be referred to as a "fingerprint" of the instantaneous deformation state of the at least one second component. The deformation state of the at least one second component may thus be reliably recognized by evaluation unit 16 based on the at least one ascertained location-dependent stress distribution in semiconductor component 12.

The deformation state ascertained by evaluation unit 16 may be understood to mean, in particular, a deformation state of the at least one second component caused by at least one environmental influence on the at least one second component. Environmental influences such as, for example, temperature fluctuations close to the at least one second component, a penetration of air moisture into the at least one second component, a penetration of at least one chemical substance or a mixture of chemical substances into the at least one second component, a peripheral stress on the at least one second component, effects of an installation of the at least one second component and/or an ageing of the at least one second component frequently cause a deformation of at least a part of a module component such as, for example, of an adhesive, of a substrate and/or of a mold. The deformations of the at least one second component caused by the at least one environmental influence may also be referred to as environmental effects. Such environmental effects cause a stressing of the semiconductor component 12 of module 10 due to the mechanical coupling of the at least one second component with semiconductor component 12, on the basis of which evaluation unit 16 is able to reliably recognize the deformation state of the at least one second component.

Thus, in module 10 described herein, the deficiency of the related art that environmental effects traditionally may neither be reliably determined nor efficiently quantified is remedied. Instead, in module 10, even deformations of the at least one second component, which are caused by at least one environmental influence with a comparatively slow time constant, may be reliably recognized/verified. As becomes clear based on the following description, it is possible in the case of module 10 as compared to the related art to respond more advantageously to such deformations of the at least one second component.

One particular advantage of the design/programming of evaluation unit 16 described herein is that only stress measured values $l_{out}$ of stress measuring cells 14 must be evaluated for ascertaining the deformation state of the at least one second component. The use of a further sensor system such as, for example, a temperature sensor and/or a moisture sensor, is not necessary for ascertaining the deformation state of the at least one second component. Moreover, no complex sensor value histories are required to be evaluated for ascertaining the deformation state of the at least one second component. Evaluation unit 16 of module 10 may thus be comparatively cost effectively designed and with a relatively small installation space requirement.

As is schematically represented in FIG. 1, at least a portion of stress measuring cells 14 may be designed to detect at least one direction-dependent stress measured value/stress and/or strain measured value (as stress measure value $l_{out}$). In the example of FIG. 1, stress measuring cell 14 shown enlarged is designed to measure for different directions $r_{-45}$, $r_0$, $r_{45}$ and $r_{90}$ a stress occurring along respective direction $r_{-45}$, $r_0$, $r_{45}$ or $r_{90}$ and/or a stress difference (as stress values $l_{out}$) occurring between two different directions $r_{-45}$, $r_0$, $r_{45}$ and $r_{90}$ and to output to evaluation unit 16. By determining the stress difference occurring between two different directions $r_{-45}$, $r_0$, $r_{45}$ and $r_{90}$, it is possible to reduce installation-related or temperature-related influences on these stress measured values $l_{out}$. The different directions $r_{-45}$, $r_0$, $r_{45}$ and $r_{90}$, for which the stress occurring along the respective direction $r_{-45}$, $r_0$, $r_{45}$ or $r_{90}$ and or the stress difference occurring between two difference directions $r_{-45}$, $r_0$, $r_{45}$ and $r_{90}$ are determined, may be oriented angled relative to one another, in particular, at an inclination angle of 45° and/or 90°.

The at least one stress measuring cell 14 shown enlarged is preferably also designed/programmed to measure and to output to evaluation unit 16 multiple direction-dependent stress measured values as stress measured values $l_{out}$ per measuring point in time. Evaluation unit 16 may accordingly also be designed/programmed to evaluate multiple stress measured values $l_{out}$ per measuring point in time and per measuring position for ascertaining the at least one location-dependent stress distribution. Evaluation unit 16 may therefore also be designed and/or programmed to create and evaluate per measuring point in time multiple "fingerprints" of the instantaneous deformation state of the at least one second component. Evaluation unit 16 may, in particular, be designed/programmed to ascertain multiple location-dependent stress distributions for one measuring point in time by basing the individual stress distributions on the stress values generated in different ways, and to subsequently ascertain the deformation state of the at least one second component on the basis of the multiple location-dependent stress distributions.

Examples of stress distributions with stress values generated in different ways are presented below:

The stress occurring along shared direction $r_{-45}$, $r_0$, $r_{45}$ or $r_{90}$ may be measured as stress measured value $l_{out}$ for a location-dependent stress distribution in semiconductor component 12 ascertained by evaluation unit 16, for example, at the same measuring point in time at each measuring position of stress measuring cells 14. The location-dependent stress distribution ascertained with the aid of these stress measured values $l_{out}$ thus corresponds to a "(direction-dependent) fingerprint" of the instantaneous deformation state of the at least one second component at this measuring point in time. Alternatively or in addition, a location-dependent stress distribution created by evaluation unit 16 may also underlie a difference between stress measured value $l_{out}$ and a comparison value ascertained at an earlier measuring point in time for each individual measuring position of stress measuring cells 14. This corresponds to a "(direction-dependent) fingerprint" of a deformation change of the at least one second component between the instantaneous measuring point in time and the earlier measuring point in time. In all cases, the location-dependent stress distribution may be ascertained by evaluation unit 16 in the form of a gradient distribution by comparing and/or correlating the underlying stress values with a constant reference value or with the stress value of at least one stress measuring cell 14 serving as a reference. This is schematically represented in FIG. 1 with the aid of reference value/stress value $l_{ref}$.

Since at least a portion of stress measuring cells 14 may also be designed for detecting multiple direction-dependent stress measured values $l_{out}$, evaluation unit 16 may also be designed/programmed to carry out at least one functional link of multiple direction-dependent stress measured values $l_{out}$ detected at one measuring point in time at the same measuring position. Such functional links may, for example, be a summation and/or a difference formation. A location-dependent stress distribution in the semiconductor component ascertained by evaluation unit 16 may therefore also include the result of such a functional link for each individual measuring position. In this case as well, the location-dependent stress distribution with results of the functional link for each measuring position corresponds to a "fingerprint" of the instantaneous deformation state of the at least one second component. As a refinement, evaluation unit 16 may also be designed/programmed to determine a difference between a functional link created for the respective measuring portions at the instantaneous measuring point in time and a functional link ascertained at an earlier measuring point in time for the same measuring position as a comparison value. In this way as well, the location-dependent stress distribution may be determined as a "fingerprint" of a deformation change of the at least one second component between the instantaneous measuring point in time and the earlier measuring point in time. A location-dependent stress distribution in semiconductor component 12 created by evaluation unit 16 may thus also be established as a stress angle differential array. Alternatively or in addition, a stress angle differential gradient array may also be formed by evaluation unit 16 for at least one of the location-dependent stress distributions described in this paragraph by comparing and/or correlating the underlying values with a constant reference value or with the value determined for at least one stress measuring cell 14 serving as a reference.

Figure 2A:
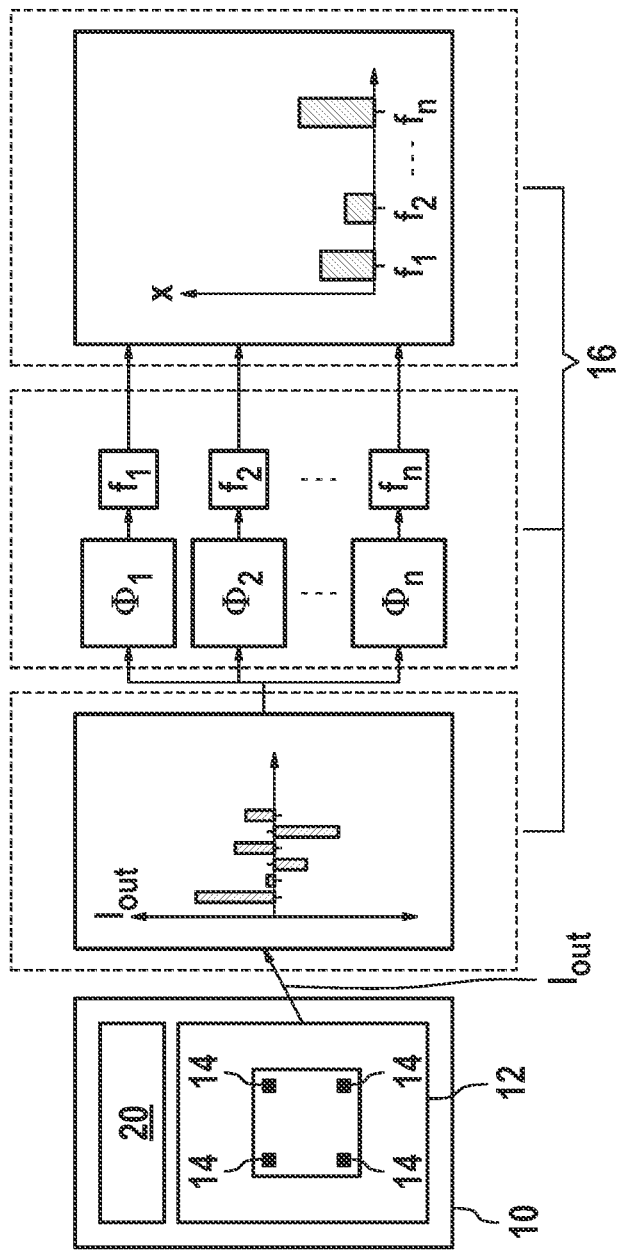
FIGS. 2A and 2B schematically show a representation of one second specific embodiment of the module, in accordance with the present invention.
Figure 2B:
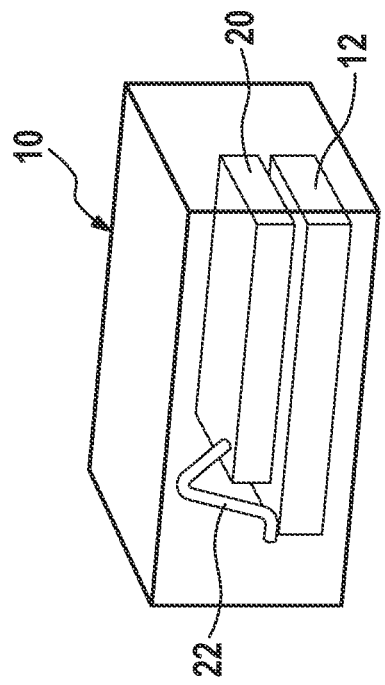

As is apparent from the preceding paragraphs, a plurality of different "fingerprints" for the instantaneous deformation state of the at least one second component may be determined by evaluation unit 16, from which reliable conclusions may then be drawn about the at least one environmental influence instantaneously affecting module 10/its at least one second component FIGS. 2A and 2B show a schematic representation of one second specific embodiment of the module.

In contrast to previously explained FIG. 1, the at least one second component 20 of module 10 is also schematically represented in FIGS. 2A and 2B. The at least one second component 20 may, for example, be/include at least one sensor component 20. The at least one sensor component 20 may, for example, be understood to mean a MEMS sensor element such as, in particular, a rotation rate sensor element, an acceleration sensor element and/or a pressure sensor element. Alternatively or in addition, the at least one sensor component 20 may also include a chemical sensor element such as, in particular, a gas sensor. The at least one sensor component 20 may equally also be designed as an optical sensor element, in particular, as a particle sensor. An optical component is further possible such as, for example, a projector installed, for example, in a pair of glasses. Thus, a plurality of various sensor elements may be used as the at least one sensor component 20 on module 10. It is also noted that the sensor types enumerated here are not to be interpreted as exhaustive for the design of the at least one sensor component 20. In addition, the at least one second component 20 may also include/be an ASIC or a MEMS element.

In module 10 of FIGS. 2A and 2B as well, stress measuring cells 14 output the stress measured values $l_{out}$ to evaluation unit 16. Evaluation unit 16 then ascertains the at least one location-dependent stress distribution in semiconductor component 12 on the basis of stress measured values $l_{out}$. In the specific embodiment of FIGS. 2A and 2B, evaluation unit 16 is also designed/programed to ascertain the deformation state of the at least one second component 20 on the basis of a comparison of the at least one ascertained, location-dependent stress distribution with predefined comparison stress distributions/comparison measured value distributions $\Phi_1$ through $\Phi_n$. The comparison stress distributions/comparison measured value distributions $\Phi_1$ through $\Phi_n$ are ascertained for defined deformation states preferably at an earlier point in time. This may be understood to mean that each comparison stress distribution/comparison measured value distribution $\Phi_1$ through $\Phi_n$ is determined in advance for one defined deformation state each. A defined deformation state may denote a "probable deformation state" of the at least one second component 20 when the at least one second component 20 is affected by only one environmental influence. The comparison stress distributions/comparison measured value distributions $\Phi_1$ through $\Phi_n$ are preferably ascertained for the defined deformation states before an operation of module 10.

Evaluation unit 16 may subsequently establish, based on the comparison of the at least one ascertained location-dependent stress distribution with the previously ascertained comparison stress distributions/comparison measure value distributions $\Phi_1$ through $\Phi_n$, weighting factors $f_1$ through $f_n$, which represent to what extent the at least one ascertained location-dependent stress distribution corresponds to the respective comparison stress distribution/comparison measure value distributions $\Phi_1$ through $\Phi_n$. Based on the weighting factors $f_1$ through $f_n$ established in this way, it may be subsequently determined, with which intensity/environmental influence intensity x the environmental influences corresponding to comparison stress distributions/comparison measured value distributions $\Phi_1$ through $\Phi_n$ affect the at least one second component 20. The comparison of the at least one ascertained location-dependent stress distribution with the previously ascertained comparison stress distribution/comparison measured value distributions $\Phi_1$ through $\Phi_n$ thus enables a classification of the at least one location-dependent stress distribution, as a result of which the at least one location-dependent stress distribution may be reliably assigned to at least one of the previously defined deformation states.

In the case of environmental effects at the at least one second component 20, its deformation corresponds in a specific way to the at least one respectively acting environmental influence. For example, a moisture effect and an external stress differ in the epicenters of the deformation of the at least one second component 20. The moisture effect results in a slow moisture expansion, which introduces stress, in particular, from the edges of the at least one second component 20. In contrast, an external stress is generally introduced through the solder points of the at least one second component 20. Environmental influences thus result in the occurrence of mechanical stresses within the at least second component 20 via various active paths. Moreover, different environmental influences generally also cause different specific stress states in each case in the at least one second component 20. Thus, with the aid of the establishment of the at least one location-dependent stress distribution in semiconductor component 12 and its comparison to comparison stress distributions/comparison measured value distributions $\Phi_1$ through $\Phi_n$, it is possible to also reliably distinguish between various environmental influences.

Instead of or in addition to a use of comparison stress distributions/comparison measured value distributions $\Phi_1$ through $\Phi_n$, evaluation unit 16 may also be designed/programmed to ascertain the deformation state of the at least one second component 20 on the basis of a comparison of the at least one ascertained location-dependent stress distribution with a previously determined model for the deformation behavior of the at least one second component 20. As becomes clear based on the preceding explanations, a model for the deformation behavior of the at least one second component 20 may also be ascertained in advance, preferably before an operation of module 10, and then used for evaluating the at least one ascertained location-dependent stress distribution. Such a model also implements the above-described advantages of comparison stress distributions/comparison measured value distributions $\Phi_1$ through $\Phi_n$.

FIG. 2B represents merely by way of example a three-dimensional structure of module 10. However, the mechanical coupling of the at least one second component with semiconductor component 12 with the aid of a gold wire bond 22 is to be interpreted merely as exemplary.

With regard to further features and characteristics of module 10 of FIG. 2, reference is made to the preceding described specific embodiment of FIG. 1.

Above-described modules 10 may be designed/programmed, in particular, to carry out at least several method steps of the method described below.

Figure 3:
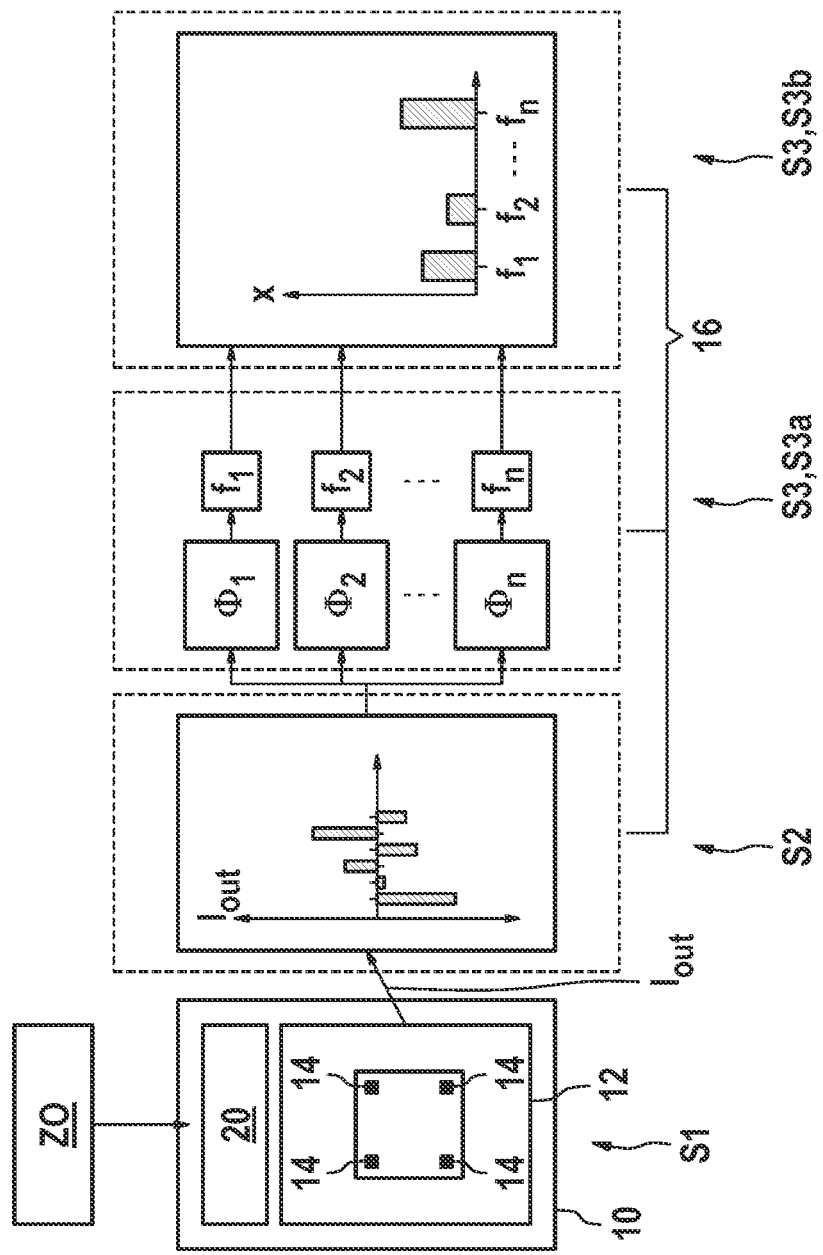
FIG. 3 shows a flowchart for explaining one first specific embodiment of the method for monitoring environmental influences on a module, in accordance with the present invention.

FIG. 3 shows a flowchart for explaining one first specific embodiment of the method for monitoring environmental influences on a module.

The method described below may be carried out with each module 10, which includes at least first component 12 in the form of semiconductor component 12 including multiple stress measuring cells 14 situated in a distributed manner, the at least one second component 20, which is mechanically coupled to semiconductor component 12, and evaluation unit 16. As previously explained above, stress measuring cells 14 are designed to detect stress measured values $l_{out}$ at different measuring positions of semiconductor component 12, the detected stress measured values $l_{out}$ being evaluatable with the aid of evaluation unit 16. For example, the method may be carried out using above-explained modules 10. It is noted, however, that a feasibility of the method described below is not limited to the use of one of these modules 10.

In a method step S1, stress measured values $l_{out}$ are detected/measured at a measuring point in time with the aid of stress measuring cells 14. Examples of stress measured values $l_{out}$ determinable with the aid of stress measuring cells 14 were previously mentioned above.

In a method step S2, at least one location-dependent stress distribution in semiconductor component 12 is subsequently ascertained on the basis of detected stress measured values $l_{out}$ with the aid of evaluation unit 16. Multiple location-dependent stress distributions in semiconductor component 12 may, in particular, also be determined in method step S2 as "fingerprints" of an instantaneous deformation state of the at least one second component 20. Advantageous possibilities for creating the location-dependent stress distributions were previously explained above.

A deformation state of the at least one second component 20 is subsequently ascertained in a further method step S3 at the measuring point in time on the basis of the at least one ascertained location-dependent stress distribution in semiconductor component 12 with the aid of evaluation unit 16. Thus, an execution of the method described herein also creates the advantages previously explained above.

Method step S3 includes merely by way of example in the specific embodiment described herein a sub-step S3a, in which the at least one location-dependent stress distribution established in method step S2 is compared with comparison stress distributions $\Phi_1$ through $\Phi_n$ ascertained previously for defined deformation states. In this case, weighting factors $f_1$ through $f_n$ are ascertained in sub-step S3a for comparison stress distributions $\Phi_1$ through $\Phi_n$ with the aid of a weighting and of a linear combination. Environmental influence intensities x are subsequently established in a further sub-step S3b of method step S3 for various environmental influences based on weighting factors $f_1$ through $f_n$.

In the specific embodiment of FIG. 3, for example, the air moisture changes in surroundings of module 10 in a state change Z0 preceding method steps S1 through S3, which results in a penetration of air moisture at least into the at least one second component 20. This may be reliably recognized as "change in air moisture" by carrying out method steps S1 through S3. It is also noted here that further environmental effects at module 10 may also be recognized with the aid of an implementation of method steps S1 through S3.

Figure 4:
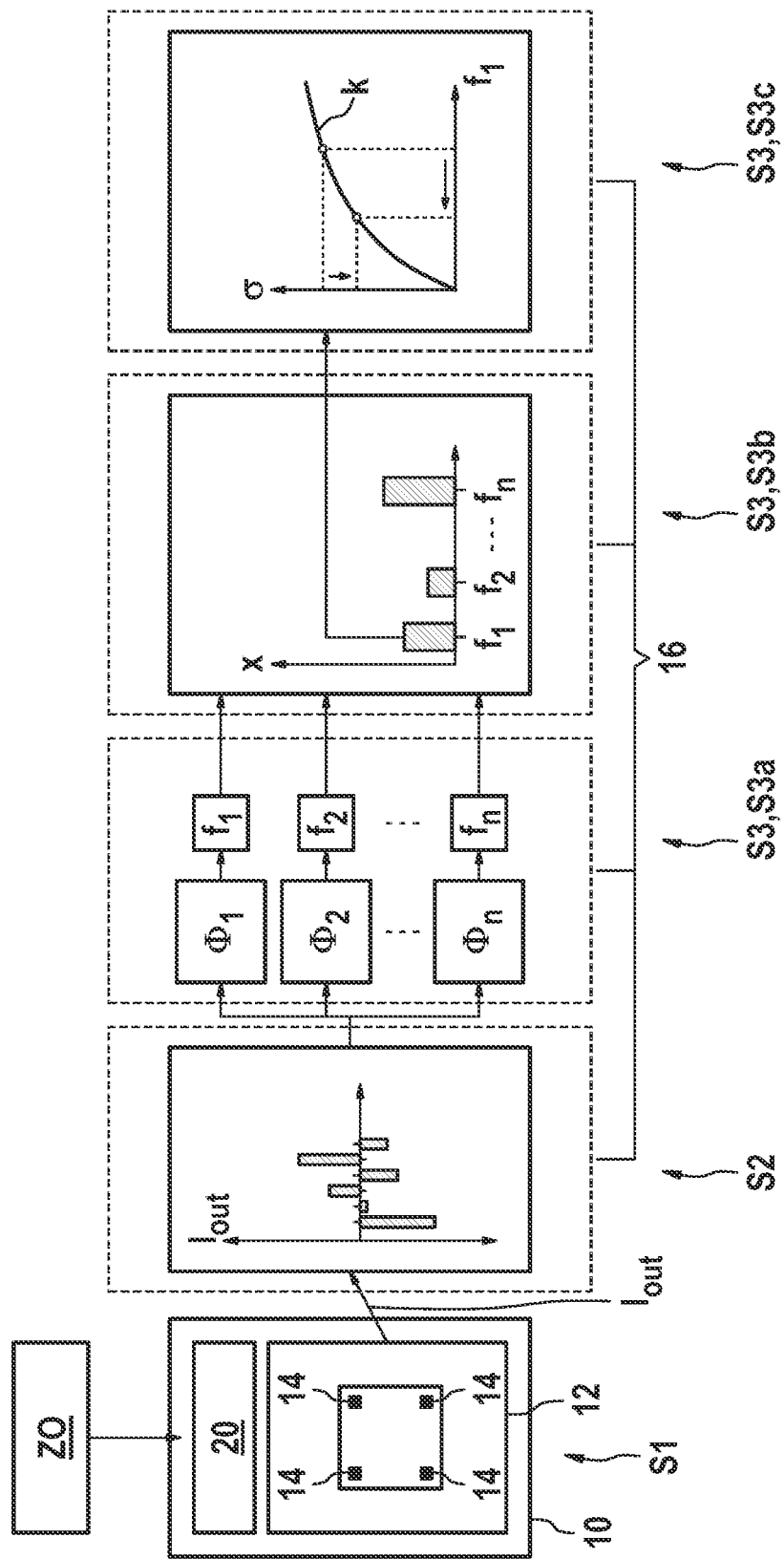
FIG. 4 shows a flowchart for explaining one second specific embodiment of the method for monitoring environmental influences on a module, in accordance with the present invention.

FIG. 4 shows a flowchart for explaining one second specific embodiment of the method for monitoring environmental influences on a module.

As an advantageous refinement of the specific embodiment previously described, method step S3 in the method of FIG. 4 also includes, in addition to sub-steps S3a and S3b, one further sub-step S3c. As previously explained above, a characterization/isolation of the environmental influence "change in air moisture" takes place in sub-steps S3a and 3b.

Moreover, a moisture value σ for the surroundings of module 10 is determined/re-established in sub-step S3c by evaluation unit 16 based on the ascertained deformation behavior of the at least one second component 20, or on the basis of ascertained weighting factor $f_1$ of the environmental influence "change in air moisture", and using a predefined characteristic curve k/a predefined model. The method of FIG. 4 thus implements a measuring method for determining moisture value σ of the surroundings of module 10.

As an alternative or in addition to preceding explained sub-step S3c, a further method step may also be carried out after method step S3, in which different calibration parameters and/or different evaluation parameters of the at least one sensor component 20 (as at least part of the at least one second component 20) are selected by evaluation unit 16 for the measured values of the at least one sensor component 20, and then provided to the at least one sensor component 20. The selection of the different calibration parameters and/or of the different evaluation parameters of the at least one sensor component 20 takes place as a function of the ascertained deformation state of the at least one sensor component 20/of the at least one second component 20. For example, the selection of the different calibration parameters and/or of the different evaluation parameters may take place using a predefined characteristic curve and/or a predefined model.

Thus, in addition to the detection of environmental influences affecting module 10/its at least one second component 20, a compensation of these environmental influences is possible with the aid of the method step described in the preceding paragraph. Moreover, a more targeted, more reliable and more situationally appropriate compensation is possible due to more exact knowledge of the respectively active environmental influence, in particular, by utilizing the above-explained distinguishability between the various environmental influences for isolating the respective active environmental influence. As a result of the selection of the different calibration parameters and/or different evaluation parameters executed as compensation, it is possible to avoid and/or correct out "error images" caused by environmental influences on the measured values of the at least one sensor component 20 such as, for example, a drift, an error deviation and/or an offset to the measured values. It is possible, in particular, by the targeted selection of the calibration parameters of the at least one sensor component 20 to adapt/optimize its functions in such a way with respect to the respectively active environmental influence, that an occurrence alone of the "erroneous images" is prevented.

With regard to further method steps of the method of FIG. 4, reference is made to the preceding described specific embodiment of FIG. 3.

Figure 5:
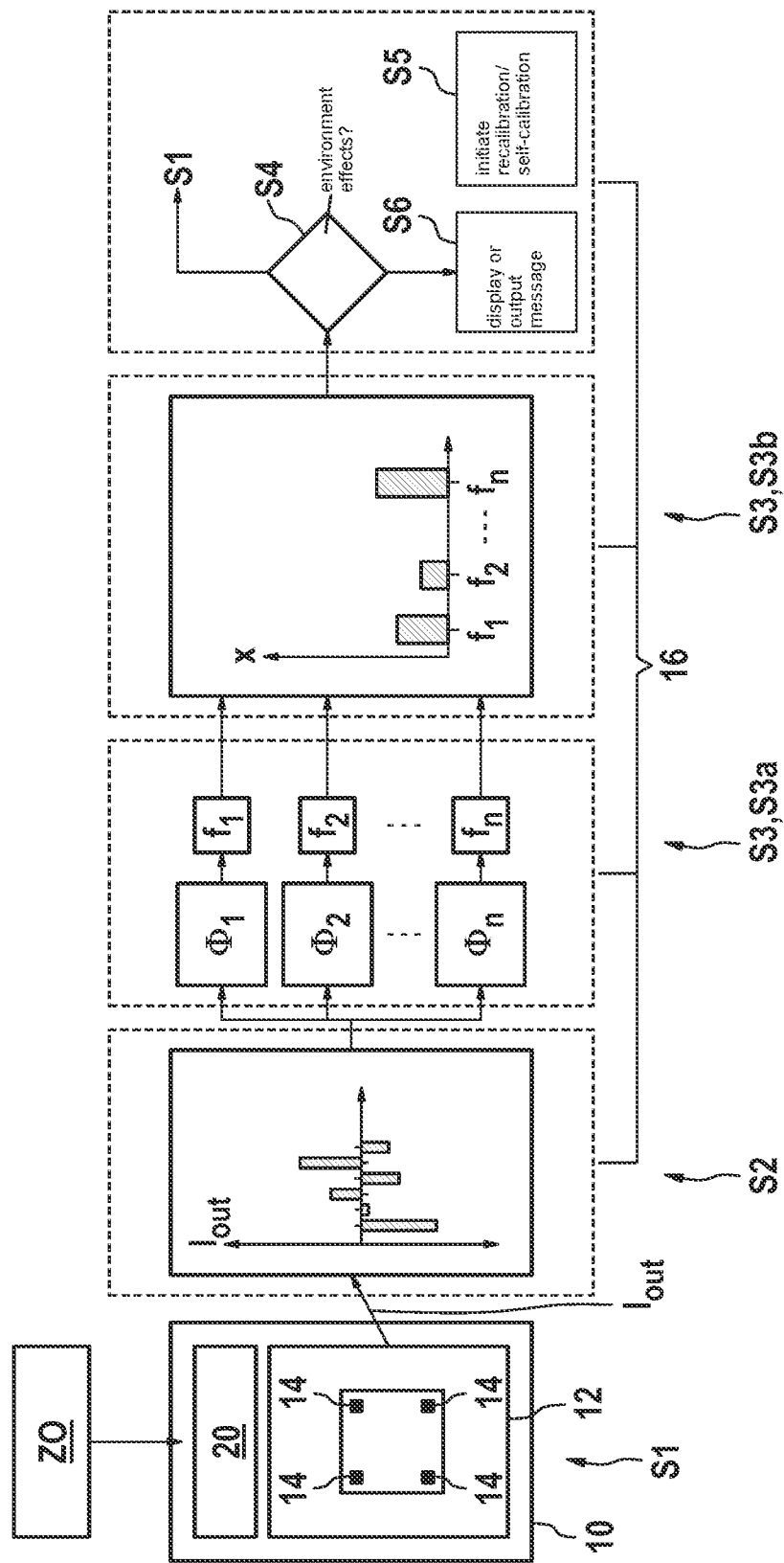
FIG. 5 shows a flowchart for explaining one third specific embodiment of the method for monitoring environmental influences on a module, in accordance with the present invention.

FIG. 5 shows a flowchart for explaining one third specific embodiment of the method for monitoring environmental influences on a module.

The method of FIG. 5 includes as a refinement compared to the specific embodiment of FIG. 3 an additional method step S4. In method step S4, it is examined with the aid of evaluation unit 16 based on the ascertained deformation state of the at least one sensor component 20 (as at least part of the at least one second component 20), whether environmental effects have occurred, in particular, at the at least one sensor component 20. This may take place, for example, by ascertaining whether significant changes in weighting factors $f_1$ through $f_n$ have occurred. If this is the case, a recalibration/self-calibration of the at least one sensor component 20 is initiated as method step S5. A recognition of an environmental influence clearly affecting the at least one sensor component 20 is thus utilized as a trigger for a recalibration/self-calibration of the at least one sensor component 20. Alternatively, an indication for carrying out a calibration of the at least one sensor component 20 may be output to a user of module 20. Otherwise, i.e., if no environmental effects are established in method step S3, an execution of method step S5 is omitted.

Alternatively or in addition to method step S5, a method step S6 may also be carried out, provided that it is recognized in method step S4 that environmental effects have occurred, in particular, at the at least one sensor component 20. Method step S6 may, for example, always be carried out when it is recognized in method step S4 that the at least one sensor component 20 is in a previously predefined deformation state. The previously predefined deformation state may, in particular, be understood to mean a deformation state, in which the desired operability of the at least one sensor component 20 is not ensured. As method step S6, a message regarding the recognized deformation status of the at least one sensor component 20 is displayed and/or output. The display may, for example, take place by setting a flag and/or by an interrupt.

In addition, evaluation unit 16 may also be utilized to switch between different operating modes as a function of the ascertained deformation status of the at least one sensor component 20. In this case, for example, the sensor operation of module 10 in a method step not visually represented in FIG. 5 may always be switched off if the operability of the at least one sensor component 20 is not ensured.

With regard to further method steps of the method of FIG. 5, reference is made to the preceding described specific embodiments of FIGS. 3 and 4.

When carrying out all above-described methods, it is also possible to save energy by initially selectively activating at least evaluation unit 16. The activation at least of evaluation unit 16 may take place, for example, event-based, user-initiated and/or at regular time intervals.

What is claimed is:

1. A module, comprising:
a first component in the form of a semiconductor component including multiple stress measuring cells situated in a distributed manner for detecting stress measured values at different measuring positions of the semiconductor component;
at least one second component mechanically coupled to the semiconductor component; and
an evaluation unit, which is configured to:
ascertain at least one location-dependent stress distribution in the semiconductor component based on the stress measured values detected at one measuring point in time, and
ascertain a deformation state of the at least one second component at the measuring point in time based on the at least one ascertained location-dependent stress distribution in the semiconductor component,
wherein the evaluation unit is configured to base the at least one location-dependent stress distribution in the semiconductor component for each individual measuring position on a stress value,
wherein the evaluation unit is configured to ascertain a measuring point in time of multiple location-dependent stress distributions by basing the individual stress distributions on stress values generated in different ways, and the deformation state of the at least one second component being subsequently ascertained based on the multiple location-dependent stress distributions.

2. The module as recited in claim 1, wherein at least a portion of the stress measuring cells is designed to detect at least one direction-dependent stress-measured value.

3. The module as recited in claim 1, wherein the stress value is generated as
a. the stress measured value detected at one measuring point in time, or
b. a difference between the stress measured values at one first and one second measuring point in time, or
c. a functional link of multiple direction-dependent stress measured values detected at one measuring point in time at the same measuring position, or
d. a difference between functional links of multiple direction-dependent stress measured values, which have been detected at one first and one second measuring point in time at the same measuring position.

4. The module as recited in claim 1, wherein the evaluation unit is configured to ascertain the location-dependent stress distribution in the form of a gradient distribution by comparing and/or correlating underlying stress values with a constant reference value or with the stress value of at least one stress measuring cell serving as a reference.

5. The module as recited in claim 1, wherein the evaluation unit is configured to ascertain the deformation state of the at least one second component based on a comparison of the at least one ascertained location-dependent stress distribution with location-dependent stress distributions ascertained previously for defined deformation states.

6. The module as recited in claim 1, wherein the evaluation unit is configured to ascertain the deformation state of the at least one second component based on a comparison of the at least one ascertained location-dependent stress distribution with a previously determined model for a deformation behavior of the at least one second component.

7. The module as recited in claim 1, wherein the evaluation unit is configured to assign a moisture value and/or a concentration value for at least one chemical substance or a mixture of chemical substances to the ascertained deformation behavior of the at least one second component.

8. The module as recited in claim 7, wherein the evaluation unit is configured to output the moisture value or the concentration value.

9. The module as recited in claim 1, wherein the semiconductor component is implemented as an ASIC or a MEMS element with the integrated stress measuring cells.

10. The module as recited in claim 1, wherein the at least one second component includes at least one sensor component including: (i) a MEMS sensor component including a rotation rate sensor element, and/or an acceleration sensor element, and/or a pressure sensor element, and/or (ii) a chemical sensor element including a gas sensor, and/or (iii) an optical sensor element including a particle sensor.

11. The module as recited in claim 10, wherein the evaluation unit is configured to provide different calibration parameters and/or different evaluation parameters for the measured values of the at least one sensor component as a function of the ascertained deformation state of the at least one sensor component.

12. The module as recited in claim 9, wherein the evaluation unit is configured to initiate a recalibration of the at least one sensor component as a function of the ascertained deformation state of the at least one sensor component.

13. The module as recited in claim 9, wherein the evaluation unit is configured to: (i) indicate and/or to output when the at least one sensor component is in a previously defined deformation state when an operability of the at least one sensor component is not ensured, and/or (ii) to switch between different operating modes as a function of the ascertained deformation state of the at least one sensor component to switch off the sensor operation when the operability of the at least one sensor component is not ensured.

14. A method for monitoring environmental influences on a module, the module including a first component in the form of a semiconductor component including multiple stress measuring cells situated in a distributed manner for detecting stress measured values at different measuring positions of the semiconductor component, at least one second component which is mechanically coupled to the semiconductor component, and an evaluation unit for the detected stress measured values, the method comprising the following steps:

detecting stress measured values at a measuring point in time using the stress measuring cells;

ascertaining at least one location-dependent stress distribution in the semiconductor component, using the evaluation unit, based on the detected stress measured values; and ascertaining a deformation state of the at least one second component at the measuring point in time, using the evaluation unit, based on the at least one ascertained location-dependent stress distribution in the semiconductor component, wherein the evaluation unit is configured to base the at least one location-dependent stress distribution in the semiconductor component for each individual measuring position on a stress value, wherein the evaluation unit is configured to ascertain a measuring point in time of multiple location-dependent stress distributions by basing the individual stress distributions on stress values generated in different ways, and the deformation state of the at least one second component being subsequently ascertained based on the multiple location-dependent stress distributions.

15. The method as recited in claim 13, wherein at least the evaluation unit is selectively activated for ascertaining the location-dependent stress distribution and/or the deformation state of the at least one second component, the selective activation being event-based and/or at regular time intervals and/or user-initiated.

* * * * *